United States Patent
Braun

(10) Patent No.: US 12,412,911 B2
(45) Date of Patent: Sep. 9, 2025

(54) FUEL CELL SYSTEM HAVING ENERGY RECUPERATION

(71) Applicant: Robert Bosch GmbH, Stuttgart (DE)

(72) Inventor: Jochen Braun, Heimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/837,274

(22) PCT Filed: Feb. 21, 2023

(86) PCT No.: PCT/EP2023/054283
§ 371 (c)(1),
(2) Date: Aug. 9, 2024

(87) PCT Pub. No.: WO2023/165847
PCT Pub. Date: Sep. 7, 2023

(65) Prior Publication Data
US 2025/0140882 A1    May 1, 2025

(30) Foreign Application Priority Data
Mar. 3, 2022 (DE) .................... 10 2022 202 175.4

(51) Int. Cl.
*H01M 8/04111* (2016.01)
*F01D 15/10* (2006.01)
(Continued)

(52) U.S. Cl.
CPC ......... *H01M 8/04111* (2013.01); *F01D 15/10* (2013.01); *H01M 8/04067* (2013.01);
(Continued)

(58) Field of Classification Search
CPC ......... H01M 8/04111; H01M 8/04067; H01M 8/04201; H01M 2250/20;
(Continued)

(56) References Cited

U.S. PATENT DOCUMENTS 10,033,056 B2 * 7/2018 Guidry ............... H01M 8/04111
10,680,260 B2 * 6/2020 Grundei ............ H01M 8/04231
(Continued)

FOREIGN PATENT DOCUMENTS

CN    102628402 A    8/2012
CN    106945560 A    7/2017
(Continued)

OTHER PUBLICATIONS

Translation of International Search Report for Application No. PCT/EP2023/054283 dated May 17, 2023 (2 pages).

*Primary Examiner* — Jesse S Bogue
(74) *Attorney, Agent, or Firm* — Michael Best & Friedrich LLP

(57) ABSTRACT

A fuel cell system comprises a first fuel cell stack pair with a first fuel cell stack and a second fuel cell stack, a first compressor arrangement, and a first turbine arrangement, wherein the first compressor arrangement can be coupled to cathode inlets of the fuel cell stack of the first fuel cell stack pair, wherein the first turbine arrangement can be coupled to cathode outlets of the fuel cell stack of the first fuel cell stack pair, wherein the first turbine arrangement comprises a shaft, a first turbine which is connected to the shaft, a second turbine which is connected to the shaft, and a generator which is connected to the shaft, wherein the first compressor arrangement comprises at least one electrically operable compressor, and wherein the generator can be coupled to the at least one electrically operable compressor.

9 Claims, 9 Drawing Sheets

(51) Int. Cl.
*H01M 8/04007* (2016.01)
*H01M 8/04082* (2016.01)

(52) U.S. Cl.
CPC ..... *H01M 8/04201* (2013.01); *F05D 2220/76* (2013.01); *H01M 2250/20* (2013.01); *H01M 2250/402* (2013.01)

(58) Field of Classification Search
CPC ........ H01M 2250/402; H01M 8/04014; F01D 15/10; F05D 2220/76; Y02E 60/50
See application file for complete search history.

(56) References Cited

U.S. PATENT DOCUMENTS

| | | | |
|---|---|---|---|
| 10,693,157 B2* | 6/2020 | Lucas | H01M 8/04164 |
| 2010/0062301 A1 | 3/2010 | Hendriks | |
| 2015/0244007 A1* | 8/2015 | Nakamoto | H01M 8/04395 |
| | | | 429/446 |
| 2017/0077534 A1* | 3/2017 | Guidry | H01M 8/04761 |
| 2022/0344683 A1* | 10/2022 | Ancimer | H01M 8/04111 |
| 2024/0136553 A1* | 4/2024 | Prince | H01M 8/04753 |

FOREIGN PATENT DOCUMENTS

| | | | |
|---|---|---|---|
| DE | 102015004718 A1 | 10/2016 | |
| EP | 2542836 B1 | 9/2016 | |
| EP | 3758119 A1 | 12/2020 | |
| JP | 2005310429 A | 11/2005 | |
| JP | 2006286559 A | 10/2006 | |
| WO | 2021092021 A1 | 5/2021 | |

\* cited by examiner

FUEL CELL SYSTEM HAVING ENERGY RECUPERATION

BACKGROUND

The present invention relates to a fuel cell system.

In vehicles in which, among other things, drive energy is also supplied by fuel cells, the oxidizing agent oxygen from the ambient air is generally used to react with hydrogen to form water in the fuel cell and thus to supply electrical power by electrochemical conversion. The ambient air is typically supplied to one or more fuel cell stacks by means of a compressor. This requires an air mass flow and a corresponding pressure level depending on operating points. The compressor typically comprises a thermal flow machine. Optionally, energy recuperation from outflowing air can also be realized by means of a turbine for air compression.

Higher system pressures, in particular for high-performance fuel cell systems, can require two-stage compression as well as energy recuperation by means of a turbine. This is usually achieved according to the prior art with a dual shaft air system in which an electrically-operated compressor is combined with a turbine-operated compressor. Alternatively, electrically driven, single-stage compressors with turbines are also known. A disadvantage of these concepts is that the supply air and exhaust air are always directly coupled, resulting in conflicting goals with regard to the design, cost, and operation of fuel cells with such compressors.

SUMMARY

One object of the invention is to propose a fuel cell system, in particular with a plurality of fuel cell stacks, which can be operated without a direct coupling between the supply air and exhaust air and yet is capable of allowing sufficiently high pressures for a cathode path with simultaneous energy recuperation.

The problem is solved by a fuel cell system having the features of the disclosure.

A fuel cell system is proposed comprising at least one fuel cell stack each having an anode inlet, an anode outlet, a cathode inlet and a cathode outlet, a turbine arrangement, and an oxidant supply means for supplying an oxidant to the relevant cathode inlet, wherein the turbine arrangement is arranged downstream of the relevant cathode outlet of at least one of the at least one fuel cell stack and can be coupled to the relevant cathode outlet, wherein the turbine arrangement comprises a shaft, at least one turbine connected to the shaft, and a generator connected to the shaft, and wherein the oxidant supply means and the turbine arrangement can be operated independently of each other.

The fuel cell stacks can in particular comprise fuel cells having a polymer electrolyte membrane. They comprise a plurality of fuel cells, which are present in a stacked arrangement and in particular comprise an electrical series and/or parallel connection for increasing the output voltage and/or the specified current. The fuel cells are preferably separated from each other by bipolar plates, which distribute the educts over a large area, take up and discharge product water, implement active cooling, and allow the flow of current. Each fuel cell stack has an anode path and a cathode path, wherein the cathode inlets are supplied with air and exhaust air is delivered to the cathode outlets. Hydrogen is supplied to the anode paths. For this purpose, corresponding lines, valves, and other devices are provided that adjust and maintain a pressure level dependent on the operating point of the respective fuel cell stack. Such an arrangement is also called a balance of plant. However, this is insignificant in the context of the present invention, as here the focus is on the cathode path.

The relevant cathode outlet of the at least one fuel cell stack is connected to the turbine arrangement. At least one turbine is arranged therein and preferably has a turbine housing comprising a turbine inlet and a turbine outlet as well as a flow channel which extends between them in a favorable manner in terms of fluid mechanics. The turbine has a turbine wheel connected to the shaft. The turbine wheel is acted upon by exhaust air flowing into the turbine inlet, causing it to rotate. Due to the arrangement on a common shaft, the turbine or turbines output mechanical power to the shaft to thereby drive the electrical generator located on the shaft.

The turbine arrangement only comes in contact with exhaust air and is not connected to an air-conducting device, such as a compressor or other oxidant supply means. Consequently, a cathode supply path and a cathode discharge path of the at least one fuel cell stack are mechanically and, if necessary locally, completely separated from each other. The mechanical power resulting from the rotation of the turbine is converted to electrical power with a certain degree of efficiency. This can be fed into an on-board power system and/or an electrical energy store or consumed in a unit in the relevant vehicle or also in the fuel cell system itself, if necessary with prior conversion to a desired voltage level. Under certain circumstances, this could also be at least partially due to an air compressor drive in the cathode supply path. A direct connection between the generator and an electrically operable compressor is not necessary.

The structure according to the invention allows a more flexible, modular and optimized design for the cathode supply path and the cathode discharge path. The cathode supply path can be an air intake path, for example, and can be provided with pressurized air. A supply from an oxygen source would also be conceivable. The oxidant supply means could therefore comprise in particular a compressor arrangement having at least one compressor or another device. Synchronization of the cathode supply and cathode discharge path is not required, resulting in a more flexible operating strategy. Various conflicting objectives with regard to consumption, degradation, and the required dynamics can be resolved significantly better than with conventional fuel cell systems. A special freeze-start process is not required for protection. Any frozen/blocked turbine(s) do not prevent operation of the fuel cell system and can be thawed with warm exhaust air. Compressors and turbines can be integrated into an on-board electrical system of a fuel cell vehicle in different ways and the system has additional degrees of freedom, which are particularly helpful in the event of faults. The design of the turbine arrangement is modular, as is possible with turbine-driven compressors and allows a modular concept. Air bearings do not necessarily have to be used for bearings on the turbine arrangement due to the separation from a supply air path, in particular oil-lubricated bearings can also be used. For example, two radial bearings and one axial bearing can be used, with the resulting economies of scale. The at least one turbine could be equipped with or without adjustment devices, e.g., variable turbine geometry.

The at least one fuel cell stack can be any number of fuel cell stacks. In a simple variant, the fuel cell system only comprises one fuel cell stack. However, two, three, four, or more fuel cell stacks can also be used. It is conceivable to use a single, common compressor for providing air to the cathode inlets of a plurality of fuel cells. However, it is also contemplated to use a plurality of compressors for a group of fuel cell stacks or to provide a separate compressor for each fuel cell stack.

The fuel cell system could also have at least one selectively openable turbine bypass for controlling a turbine output of the at least one turbine. This can be used to influence an exhaust air mass flow that flows into the relevant turbine. Preferably, the bypass is infinitely variable and the mass flow can therefore be continuously divided between an exhaust flow that flows through the turbine and an exhaust flow that flows directly downstream into the environment. The turbine bypass can also be used for pressure control in the fuel cell stack.

At least one pressure control valve could be arranged upstream or downstream of the at least one turbine. The operating point of at least one turbine could be influenced or optimized by controlling the relevant pressure control valve accordingly. It may be possible to control the pressure control valve as a function of the respective pressure and/or exhaust mass flow, such that the turbine output is continuously optimized for the current operating point.

The at least one fuel cell stack could comprise at least one cathode bypass which is configured to supply an oxidant flow provided by the oxidant supply means, i.e., in particular compressed air from a compressor arrangement, at least partially directly to the relevant turbine of the turbine arrangement. In the event of a fault, for example, energy from a compressor arrangement could be converted into electrical power by the turbine arrangement.

The generator of the turbine arrangement could be designed as a motor/generator unit and drive the at least one turbine of the turbine arrangement in an emergency operating mode by supplying the generator with an electrical voltage if the oxidant supply means fails, wherein at least one of the turbines could be configured to supply air in the opposite flow direction to at least one of the fuel cell stacks. If, for example, an electrical system to which a compressor arrangement is connected fails, air from the environment could be compressed via the turbines and supplied to the relevant fuel cell stacks by reversing the operation of the turbine arrangement. This enables emergency operation of the relevant fuel cell stack and thus provides redundancy for safeguarding driving functions, in particular in a fuel cell vehicle.

The turbine arrangement could comprise a first turbine and a second turbine, wherein the first turbine and the second turbine can be coupled to the relevant cathode outlet of the at least one fuel cell stack. The at least one fuel cell stack could comprise only one fuel cell stack, for example. The cathode outlet of this one fuel cell stack could be coupled to both turbines. The exhaust flow from the one cathode outlet is therefore divided into two turbines. However, two fuel cell stacks could also be provided, both of which could be coupled to both turbines, or each could be assigned to only one of the two turbines. If more than two fuel cell stacks are provided, different variants are conceivable, which can comprise all possible combinations or permutations of the coupling of the individual fuel cell stacks to the two turbines. In particular when using two or more fuel cell stacks, for example multiple pairs of fuel cell stacks or another system concept, the mechanical design is simplified and, due to the common shaft, always leads to a conversion of power from multiple exhaust air flows regardless of the respective operating state of the respective fuel cell stack.

The at least one fuel cell stack could have two or more fuel cell stacks, wherein the two turbines can each be coupled to the cathode outlets of at least two of the fuel cell stacks. Consequently, the mass flow of at least two fuel cell stacks is divided among multiple turbines. Dividing a mass flow into two individual flows for operating two turbines is particularly advantageous with regard to the storage and design of the turbines. As a result of the lower forces generated, simpler and smaller turbine bearings can be used.

As described above, the at least one fuel cell stack could have two or more fuel cell stacks, wherein the two turbines can be coupled to the cathode outlets of at least two of the fuel cell stacks. Individual exhaust flows of individual fuel cell stacks or the exhaust flows from a portion of the existing fuel cell stacks could consequently be assigned to individual turbines. In operational strategies in which not all fuel cell stacks are operated simultaneously at times, for example, the exhaust air flow from one of the fuel cell stacks could be fed to a single turbine such that a sufficiently high pressure in the turbine, and consequently a high recuperation efficiency, is achieved.

The at least one fuel cell stack could comprise at least one fuel cell stack, the cathode outlet of which can be operated independently of the turbine arrangement. This (additional) fuel cell stack could be designed differently from the other fuel cell stacks and could in particular be designed for partial load operation or an average load, such that no high system pressures are needed in the relevant cathode path. Consequently, no recuperation would be necessary.

Upstream of the cathode inlet of at least one of the fuel cell stacks, a supply air heat exchanger could be arranged that is thermally connected to the respective cathode outlet in order to transfer heat from the air flowing into the cathode inlet to exhaust air from the cathode outlet. The supply air can thus be particularly easily cooled to a corresponding temperature level. At the same time, the power converted in the turbine can be slightly increased.

The first pair of fuel cell stacks can be duplicated. As a result, multiple fuel cell stack pairs can be used side by side, which can be constructed according to the above principles. These can then be referred to as second, third, fourth fuel cell stack pairs, etc. It is conceivable to also use a plurality of third fuel cell stacks. In principle, even and odd numbers of fuel cell stacks can be used. A turbine arrangement with two turbines on one shaft is particularly suitable for fuel cell stack pairs. In addition, compressor arrangements having more than one compressor can be used. All conceivable combinations of fuel cell stack pairs and individual fuel cell stacks are possible. This can be provided according to the principles of redundancy as well as usual performance and operating points.

Further measures improving the invention are described in greater detail hereinafter, together with the description of the preferred exemplary embodiments of the invention, with reference to the drawings.

BRIEF DESCRIPTION OF THE DRAWINGS

The drawings show.

DETAILED DESCRIPTION

Figure 1:
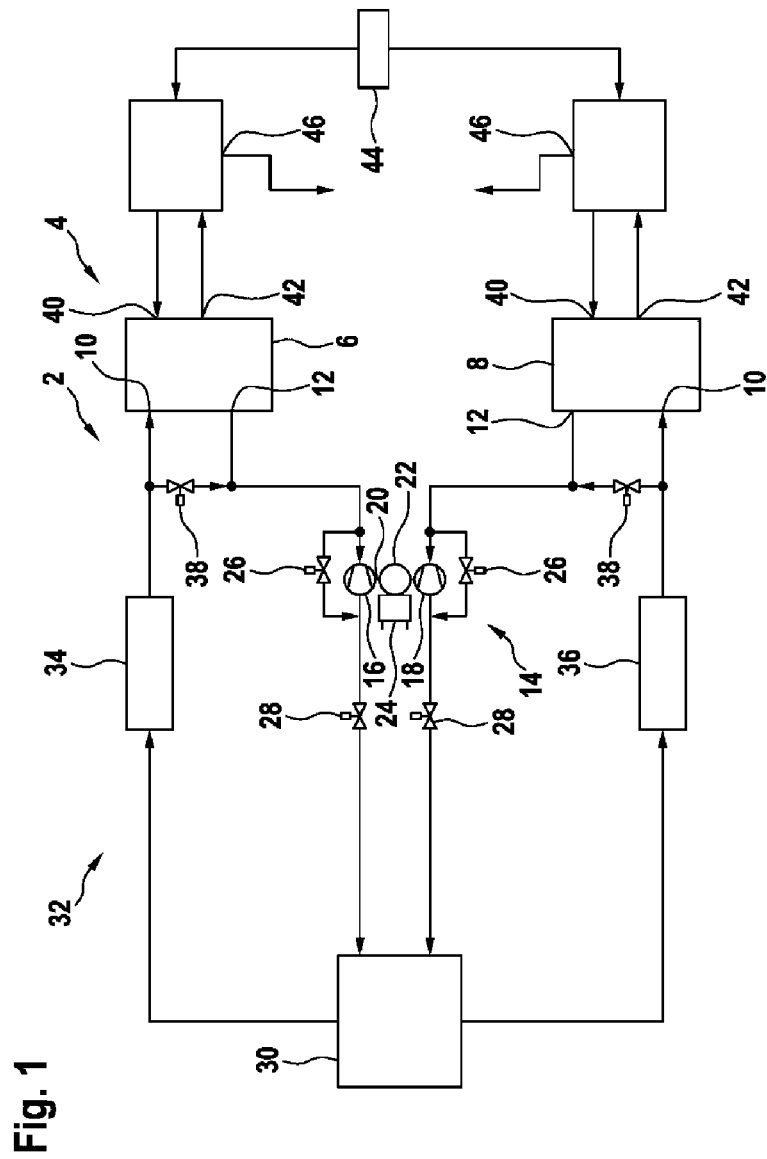
FIG. 1 a first exemplary embodiment of a fuel cell system.

FIG. 1 shows a fuel cell system 2 in a schematic, block-based diagram. A first fuel cell stack pair 4 is provided here, which comprises a first fuel cell stack 6 and a second fuel cell stack 8. Both have a cathode inlet 10 and a cathode outlet 12. A first turbine arrangement 14 is provided, having a first turbine 16 and a second turbine 18. These are arranged on a common shaft 20, on which a generator 22 is also arranged. An inverter 24 is connected to the generator 22, which is configured to deliver electrical power with an adjusted voltage to an on-board electrical system (not shown here) of a fuel cell vehicle or other superordinate device. The first turbine arrangement 14 is connected to the cathode outlets 12 of the fuel cell stacks 6 and 8. Exhaust air flowing from the cathode outlets 12 is directed through turbines 16 and 18 and consequently results in the generation of electrical power.

Both turbines each have a turbine bypass 26 through which at least part of the exhaust air mass flow can be directed past the respective turbine 16 and 18. Downstream of turbines 16 and 18, only one pressure control valve 28 is arranged in each case by way of example, by means of which an output pressure of the turbines 16 and 18 can be regulated. Preferably, the pressure control valves 28 can be dispensed with and the pressure control of the stacks can be implemented by means of valves of turbine bypasses 26. Downstream, the environment 30 into which the exhaust air flows out is indicated as a separate block.

In one advantageous variant, the generator 22 can be a motor-generator unit, such that in the event of a compressor failure, which is explained further below, the turbines 16 and 18 can be used at least temporarily in an emergency mode to provide compressed air in the reverse flow direction.

Figure 2C:
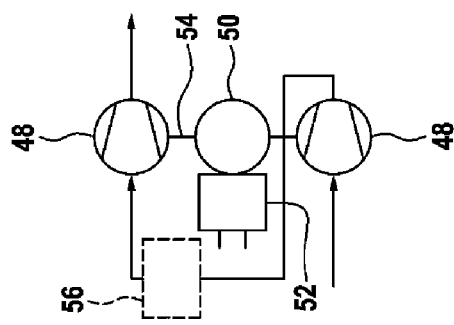
FIGS. 2a to 2c various variants of compressors.

Supply air is provided, by way of example, via a first compressor arrangement 32 comprising a first compressor 34 and a second compressor 36. They each provide pressurized air, which is drawn from the environment 30 and supplied to the cathode inlets 10. It is possible to direct compressed supply air partially past the fuel cell stacks 6 and 8 directly into the exhaust air flow via a cathode bypass 38 in order to realize rapid and precise pressure control at the cathode inlets with a variable supply air flow. The design of the compressors 34 and 36 is shown in FIGS. 2a to 2c below.

The two fuel cell stacks 6 and 8 also have an anode inlet 40 and an anode outlet 42. Hydrogen from a hydrogen tank 44 is fed into the anode inlets 40. Residual hydrogen from the anode outlets 42 can be recirculated and fed back into the anode inlets 40. Flushing or purge outlets 46 are used to remove purge gases produced by repeated or regular purging of the anodes of fuel cell stacks 6 and 8.

Figure 2B:
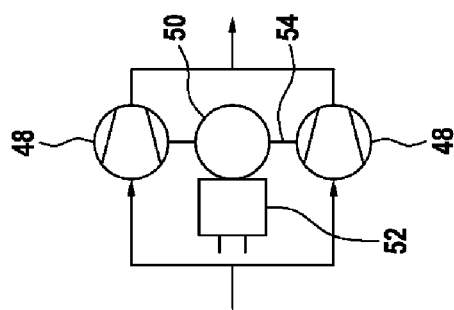
Figure 2A:
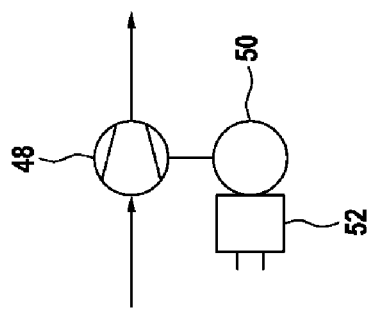

FIG. 2a shows a first variant of a compressor 34 or 36. If only a single compressor is used for both of the fuel cell stacks 6 and 8, the illustration in FIGS. 2a to 2c can also refer to the entire first compressor arrangement 32. In FIG. 2a, a compressor impeller 48 is coupled to a motor 50 that is supplied with voltage by an inverter 52. This is therefore a single-stage simple compressor.

FIG. 2b shows two compressor impellers 48 arranged parallel to each other, which are operated by a common motor 50. The mass flow to be conveyed is divided into two compressor impellers. Consequently, the mass flow can be doubled compared to the compressors in FIG. 2a, or alternatively, the impellers can be reduced in size. The two compressor impellers 48 can be arranged on a common shaft 54 and operate with the same mechanical power.

FIG. 2c shows a two-stage arrangement in which air is directed from one of the compressor impellers 48 to the other compressor impeller 48. Both compressor impellers 48 are arranged on the same shaft 54 and are driven by the same motor 50. Due to the higher pressure level, an intercooler 56 is provided in this variant for cooling the air, which is arranged between the two compressor impellers 48. Here, the pressure can be significantly increased with largely the same mass flow as with the single-stage compressor in FIG. 2a.

Figure 3:
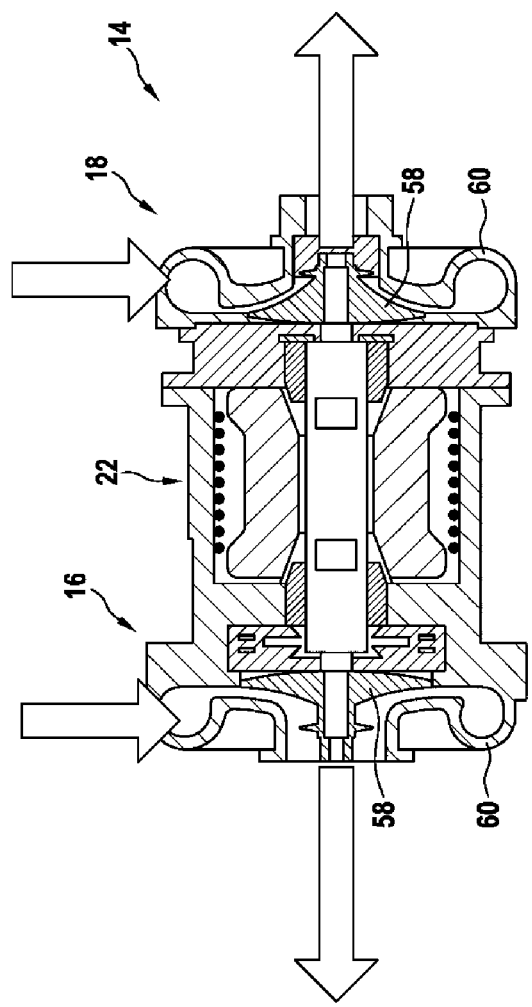
FIG. 3 a first turbine arrangement in a cross-section.

In FIG. 3, the first turbine arrangement 14 is shown in a cross-sectional view. Here, the first turbine 16 and the second turbine 18 are realized in the form of turbine impellers 58, each arranged in a turbine housing portion 60. The generator 22 is provided between the turbine impellers 58. The turbines 16 and 18 and the generator 22 have only a single, contiguous housing and form a contiguous unit, which is also independent of a supply air side. Here, exhaust air from turbines 16 and 18 flows axially outwards, wherein the exhaust air from the fuel cell stacks 6 and 8 enter the turbine housing portions radially.

Figure 4:
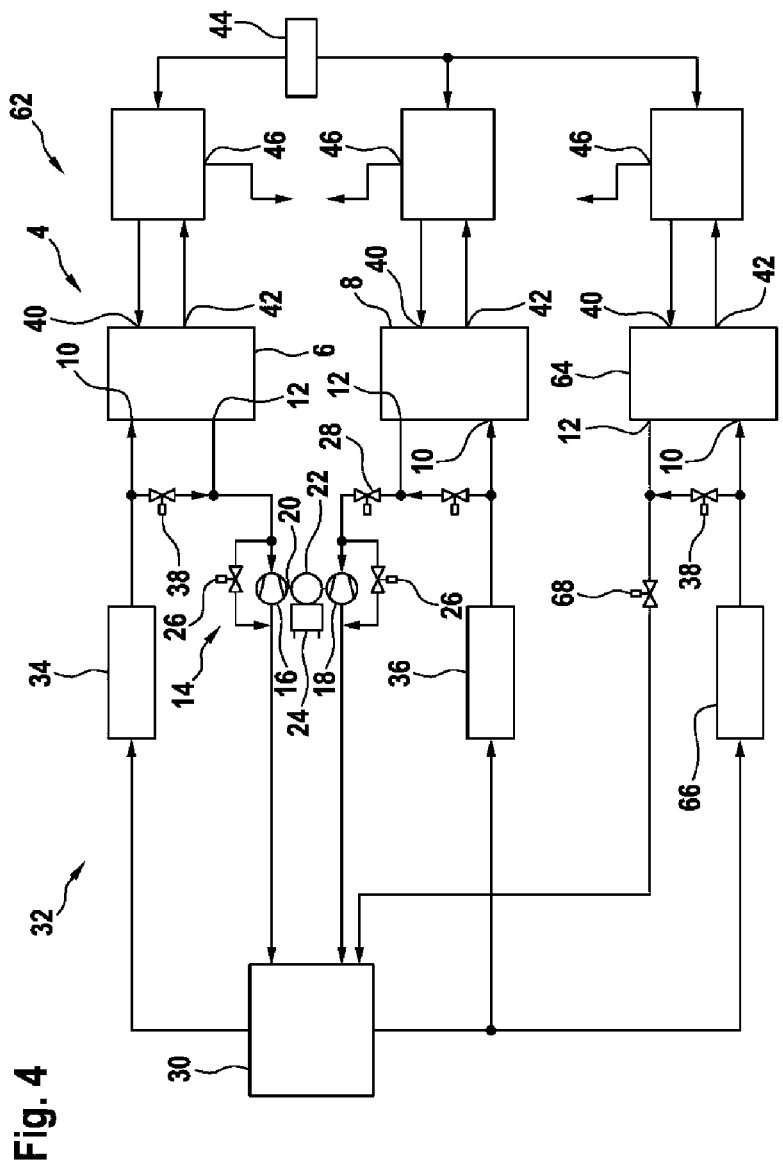
FIG. 4 a second exemplary embodiment of a fuel cell system.

FIG. 4 shows a fuel cell system 62 based on the fuel cell system 2 in FIG. 1. Here, however, in addition to the two fuel cell stacks 6 and 8 of the first fuel cell stack pair 4, there is a third fuel cell stack 64 that is independent of the first fuel cell stack pair 4. A second compressor arrangement 66, which is independent of the first compressor arrangement 32, supplies air to the third fuel cell stack 64. The third fuel cell stack 64 can be designed for partial loads or average loads. A particularly high mass air flow or pressure is not necessary for this purpose. For this reason, a compressor according to FIG. 2a or FIG. 2b, for example, could be used for the second compressor arrangement 66. Exhaust air from the cathode outlet 12 of the third fuel cell stack 64 is fed directly to the environment 30. In addition, a pressure control valve 68 is provided that is used to throttle the exhaust pressure before it enters the environment 30. Thus, for example, the pressure level in the third fuel cell stack 64 or the supply air mass flow can be controlled. Downstream of the second fuel cell stack 8, a pressure control valve 28 is arranged, which is used to throttle the relevant air flow.

Figure 5:
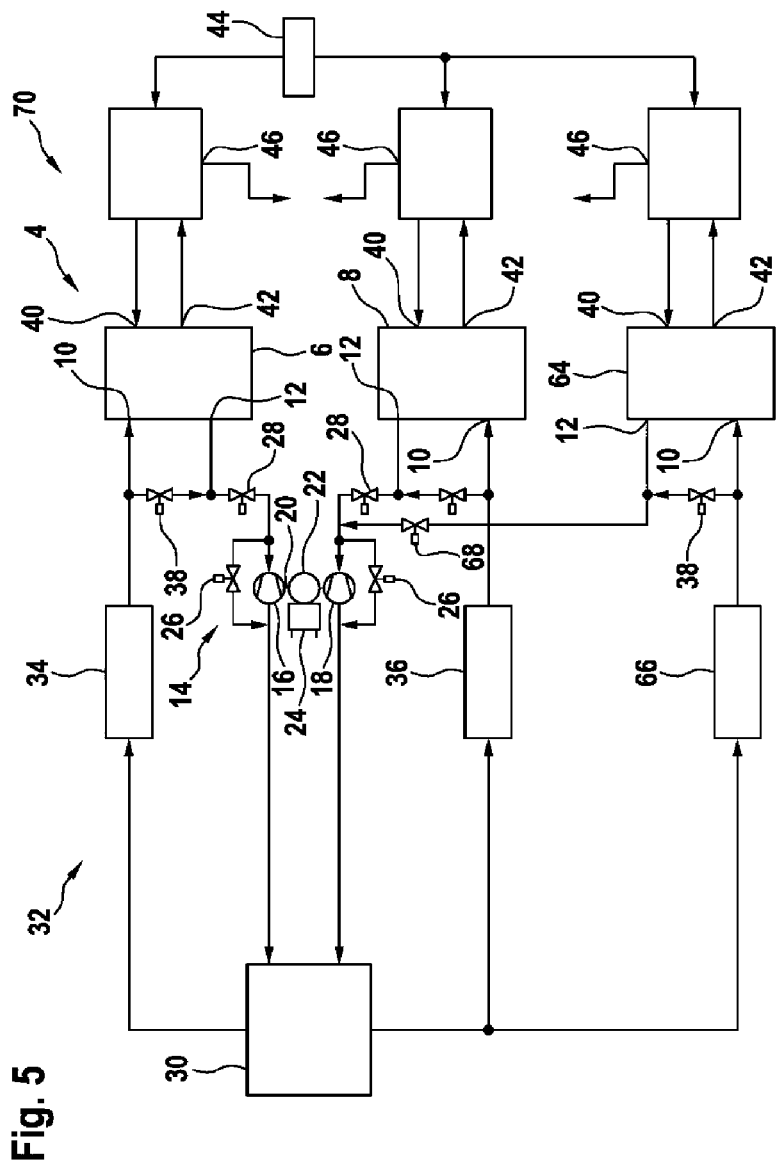
FIG. 5 a third exemplary embodiment of a fuel cell system.

FIG. 5 shows a fuel cell system 70 based on the fuel cell system 62 in FIG. 4. Here, exhaust air from the cathode outlet 12 of the third fuel cell stack 64 is fed to the first turbine arrangement 14.

Figure 6:
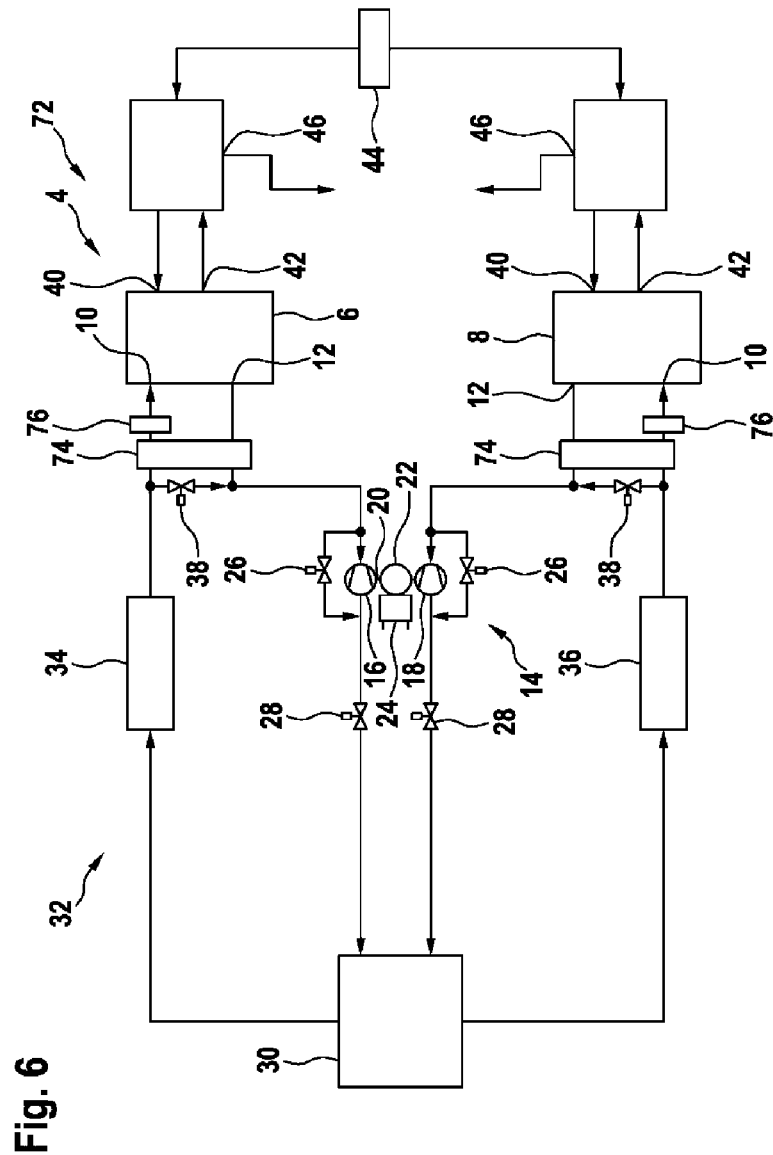
FIG. 6 a fourth exemplary embodiment of a fuel cell system.

FIG. 6 shows a fuel cell system 72 based on the fuel cell system 2 from FIG. 1. A supply air heat exchanger 74 is also provided here, which cools the supply air to the two fuel cell stacks 6 and 8 by discharging heat of the supply air into an exhaust air flow from the fuel cell stacks 6 and 8. In addition, a cooler 76 through which coolant can flow could be provided directly in front of each cathode inlet 10. This ensures a maximum permissible inlet temperature for the respective fuel cell stack 6 and 8.

Figure 7:
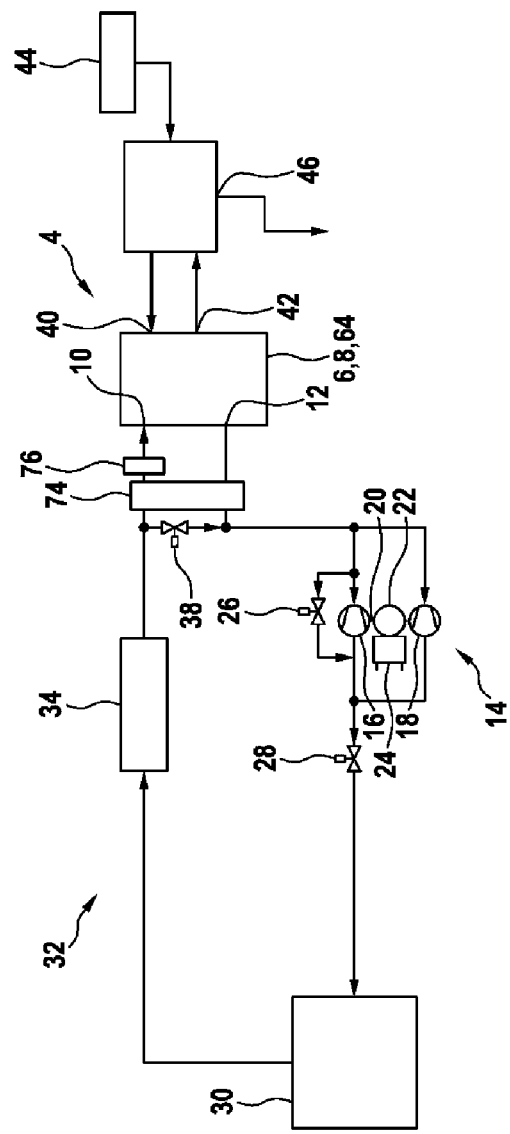
FIG. 7 a partial aspect of a fuel cell system.

FIG. 7 shows another aspect. A fuel cell stack 6 or 8 or 64 is shown here, which is coupled to the first turbine arrangement 14. Here, an exhaust flow is divided evenly between the two turbines 16 and 18 by flow splitting. This dual-flow arrangement can be useful if only a single exhaust air flow is to be used for recuperation.

Figure 8:
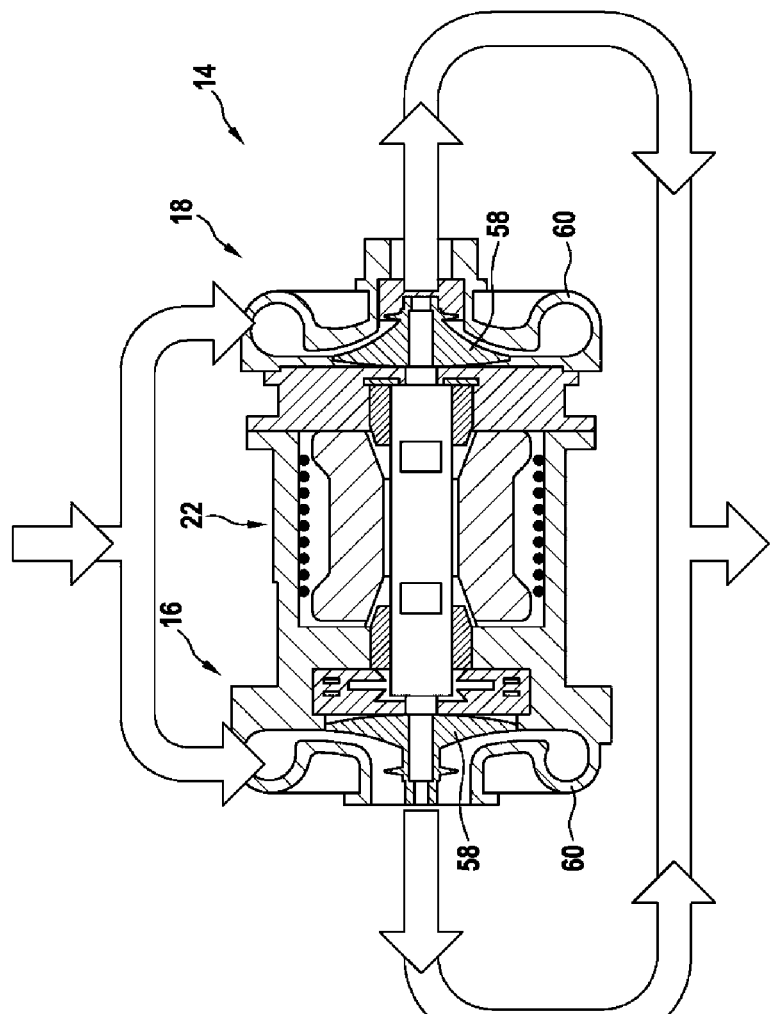
FIGS. 8 and 9 a first turbine arrangement with two connection options in a cross section.
Figure 9:
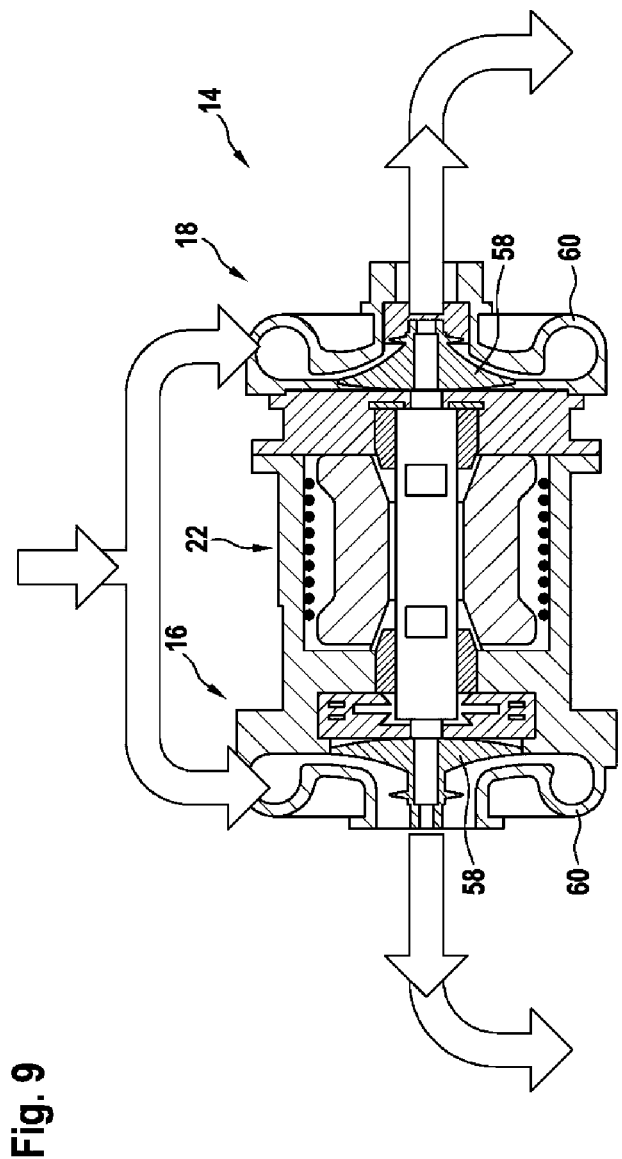

This is further shown in FIGS. 8 and 9. While in FIG. 8 the exhaust flow downstream of turbines 16 and 18 is also combined, these are fed separately to the environment in FIG. 9. Alternatively (and not shown in detail here), the turbine arrangement 14 for a single exhaust mass flow could also be designed with only one turbine impeller 58.

What is claimed is:

1. A fuel cell system (2, 62, 70, 72) comprising:
at least one fuel cell stack (6, 8) each having an anode inlet (40), an anode outlet (42), a cathode inlet (10), and a cathode outlet (12),
a turbine arrangement (14), and
an oxidant supply means for supplying an oxidant to the respective cathode inlet (10),
wherein the turbine arrangement (14) is arranged downstream of the respective cathode outlet (12) of at least one of the at least one fuel cell stack (6, 8, 64) and can be coupled to the cathode outlet (12),
wherein the turbine arrangement (14) comprises a shaft, at least one turbine (16, 18) which is connected to the shaft, and a generator (22) which is connected to the shaft (20),
wherein the oxidant supply means and the turbine arrangement (14) can be operated independently of each other,
wherein the generator (22) of the turbine arrangement (14) is configured as a motor/generator unit and drives the at least one turbine (16, 18) of the turbine arrangement (14) in an emergency operating mode in an event of failure of the oxidant supply means, by supplying an electrical voltage to the generator (22), and
wherein the at least one turbine (16, 18) is configured to supply air in a reverse flow direction to at least one of the at least one fuel cell stack (6, 8, 64) in a driven state.

2. The fuel cell system (2, 62, 70, 72) according to claim 1,
further comprising at least one selectively openable turbine bypass (26) for controlling a turbine output of the at least one turbine (16, 18).

3. The fuel cell system (2, 62, 70, 72) according to claim 1,
wherein at least one pressure control valve (28) is arranged upstream or downstream of the at least one turbine (16, 18).

4. The fuel cell system (2, 62, 70, 72) according to claim 1,
wherein the at least one fuel cell stack (6, 8, 64) comprises at least one cathode bypass (38) which is configured to supply an oxidant flow provided by the oxidant supply means at least partially directly to the respective turbine (16, 18) of the turbine arrangement (14).

5. The fuel cell system (2, 62, 70, 72) according to claim 1,
wherein the turbine arrangement (14) comprises a first turbine (16) and a second turbine (18), and
wherein the first turbine (16) and the second turbine (18) can be coupled to the respective cathode outlet (12) of the at least one fuel cell stack (6, 8, 64).

6. The fuel cell system (2, 62, 70, 72) according to claim 5,
wherein the at least one fuel cell stack (6, 8, 64) comprises two or more fuel cell stacks (6, 8, 64), and
wherein the two turbines (16, 18) can each be coupled to the cathode outlets (12) of at least two of the fuel cell stacks (6, 8, 64).

7. The fuel cell system (2, 62, 70, 72) according to claim 5,
wherein the at least one fuel cell stack (6, 8, 64) comprises at least two fuel cell stacks (6, 8, 64), and
wherein the two turbines (16, 18) can each be coupled to different cathode outlets (12) of at least two fuel cell stacks (6, 8, 64).

8. The fuel cell system (2, 62, 70, 72) according to claim 1,
wherein the at least one fuel cell stack (6, 8, 64) comprises at least one fuel cell stack (64), the cathode outlet (12) of which can be operated independently of the turbine arrangement (14).

9. The fuel cell system (2, 62, 70, 72) according to claim 1,
wherein upstream of the cathode inlet (10) of at least one of the fuel cell stacks (6, 8, 64) there is a supply air heat exchanger (74) that is thermally connected to the respective cathode outlet (12) to transfer heat from air flowing into the cathode inlet (10) to exhaust air from the cathode outlet (12).

* * * * *